UNITED STATES PATENT OFFICE.

NATHAN BARTLETT, OF CENTREVILLE, N. J., ASSIGNOR TO HIMSELF AND FRANKLIN OSGOOD, OF RICHMOND COUNTY, N. Y.

IMPROVEMENT IN THE MANUFACTURE OF PIGMENTS FROM THE SULPHURETS OF ZINC AND LEAD.

Specification forming part of Letters Patent No. 83,357, dated October 27, 1868.

To all whom it may concern:

Be it known that I, NATHAN BARTLETT, of Centreville, in the county of Hudson and State of New Jersey, have invented a new and useful Process or Improvement in the Manufacture of Pigment from the Ores of Zinc which contain Lead; and I do hereby declare that the following is a full and exact description thereof, my specification being accompanied with samples of the substance, in its different stages, from which the pigment is made, and of which—

Sample No. 1 is the ore in its natural state, consisting of the sulphurets of zinc and lead in combination; Sample No. 2, the same ore pulverized; Sample No. 3, the same ore desulphurated, and Sample No. 4 is the white pigment manufactured from said ore.

Heretofore the pigment known as the oxide of zinc has been exclusively manufactured from ores containing the carbonates or silicates of zinc, while the sulphurates of zinc that have lead in combination were not only not used for such purpose, but were considered by the trade as practically incapable of being manufactured into a pigment, thus rejecting as worthless this abundant and rich material.

The object of my invention is to reduce the sulphurets of zinc which contain lead to a pigment, and this I accomplish in the following manner:

I first pulverize the ore, and then pass it through a desulphurating-oven, and thus dissipate the sulphur. I next treat the desulphurated ore in the ordinary oxidizing-furnace, and collect the flowers in the usual manner, which completes the operation, for the zinc and lead being in combination with each other, they pass off together to the receiving-chamber.

The oxide of zinc, it is well known, makes a very white pigment; but, having little body or covering capacity, it requires to be put on in several coats, so as to produce the desired effect; and sometimes, with the view of increasing the body of the paint, it is mixed with from ten to twenty per cent. of white lead, and the greater the quantity of white lead in the composition, the more substance or covering capacity it will have. Some of the sulphurets of zinc, however, contain naturally sufficient lead to give an excellent body to the paint made from it, the lead forming from ten to thirty-five per cent. of the pigment. Such pigment will, accordingly, compare favorably with white lead in body or covering capacity, while at the same time it has all the brilliancy and whiteness of the zinc.

Having thus described my improvements in the manufacture of pigment from the sulphurets of zinc and lead combined, what I claim therein as my invention, and desire to secure by Letters Patent, is—

1. The manufacturing of pigments from the sulphurets of zinc and lead combined, in the manner and by the means substantially as herein described.

2. The pigment made from the sulphurets of zinc and lead, as a new article of manufacture.

NATHAN BARTLETT.

Witnesses:
ROBERT REID,
JOHN COCHRANE.